US011925970B2

(12) United States Patent
Shibuya et al.

(10) Patent No.: US 11,925,970 B2
(45) Date of Patent: Mar. 12, 2024

(54) COIL WINDING APPARATUS AND COIL WINDING METHOD

(71) Applicant: NITTOKU Co., Ltd., Saitama (JP)

(72) Inventors: Nao Shibuya, Omura (JP); Yuji Higeta, Omura (JP)

(73) Assignee: NITTOKU CO., LTD., Saitama (JP)

( * ) Notice: Subject to any disclaimer, the term of this patent is extended or adjusted under 35 U.S.C. 154(b) by 378 days.

(21) Appl. No.: 17/270,289

(22) PCT Filed: Mar. 9, 2020

(86) PCT No.: PCT/JP2020/010067

§ 371 (c)(1),
(2) Date: Feb. 22, 2021

(87) PCT Pub. No.: WO2020/189381

PCT Pub. Date: Sep. 24, 2020

(65) Prior Publication Data

US 2021/0178453 A1 Jun. 17, 2021

(30) Foreign Application Priority Data

Mar. 18, 2019 (JP) ................................ 2019-049389

(51) Int. Cl.

| | |
|---|---|
| ***B21F 3/04*** | (2006.01) |
| ***A24F 40/70*** | (2020.01) |
| ***B21F 9/00*** | (2006.01) |
| ***B21F 45/00*** | (2006.01) |
| ***H01F 41/04*** | (2006.01) |
| ***H01F 41/082*** | (2016.01) |

(52) U.S. Cl.
CPC ................ *B21F 3/04* (2013.01); *B21F 9/002* (2013.01); *B21F 45/00* (2013.01); *H01F 41/04* (2013.01); *H01F 41/082* (2016.01); *A24F 40/70* (2020.01)

(58) Field of Classification Search
CPC ...... A24F 40/70; H01F 41/088; H01F 41/082; B21F 3/04; B21F 23/005
See application file for complete search history.

(56) References Cited

FOREIGN PATENT DOCUMENTS

| | | | | | |
|---|---|---|---|---|---|
| CN | 102024559 | A | | 4/2011 | |
| CN | 102592822 | A | * | 7/2012 | |
| CN | 102592822 | A | | 7/2012 | |
| CN | 108420111 | A | | 8/2018 | |
| GB | 824516 | A | * | 12/1959 | |
| JP | 2016-507137 | A | | 3/2016 | |
| WO | WO-2016095101 | A1 | * | 6/2016 | ............ A24F 47/00 |

* cited by examiner

*Primary Examiner* — Livius R. Cazan
(74) *Attorney, Agent, or Firm* — Rabin & Berdo, P.C.

(57) ABSTRACT

A coil winding apparatus includes: a core rod feeding unit configured to feed a string-shaped core rod from a core rod nozzle; a core rod drawing unit configured to draw out the core rod; a wire rod feeding unit configured to feed a wire rod towards the core rod; a rotator capable of rotating about the core rod nozzle; the guide member provided on the rotator, the guide member being configured to clamp, with the core rod, the wire rod that has been fed from the wire rod feeding unit; and a rotating unit configured to rotate the rotator to rotate the guide member together with the rotator so as to revolve the wire rod around the core rod in a vicinity of the core rod nozzle.

9 Claims, 10 Drawing Sheets

COIL WINDING APPARATUS AND COIL WINDING METHOD

TECHNICAL FIELD

The present invention relates to a coil winding apparatus and a coil winding method.

BACKGROUND ART

Generally, there is a known heater element for an electronic cigarette that is formed by processing a wire rod made of a high resistivity alloy (for example, Nichrome, aldirom, constantan alloy, and so forth) into a predetermined shape (JP2016-507137A). With this heater element, a smoking effect is generated by atomizing a smoking liquid when energized. In order to atomize the smoking liquid efficiently, such a wire rod may be wound in a spiral manner around a core rod to be impregnated with the smoking liquid. According to such a heater element, the smoking liquid impregnated into the core rod may be efficiently atomized by the wire rod that is energized and heated.

SUMMARY OF INVENTION

Because the wire rod used to form the heater element made of the high resistivity alloy needs to be processed to a predetermined shape, the wire rod has a flexibility, but also, it is relatively rigid. Because the smoking liquid needs to be impregnated, the core rod is often formed into a string shape by binding heat resistive fibers such as glass fibers. The core rod having the string shape formed by binding such fibers is relatively soft. Therefore, in the manufacture of the heater element, the relatively rigid wire rod is wound around the relatively soft string-shaped core rod in a spiral manner. Thus, mechanization of manufacturing steps of the heater element is difficult, and in reality, many steps are performed by manual operations.

An object of the present invention is to provide a coil winding apparatus and a coil winding method that are capable of winding a relatively rigid wire rod around a relatively soft string-shaped core rod in a spiral manner.

According to an embodiment of the present invention, a coil winding apparatus includes: a core rod feeding unit configured to feed a string-shaped core rod from a core rod nozzle at a constant tension; a core rod drawing unit configured to draw out the core rod from the core rod nozzle against the tension by holding the core rod that has been fed from the core rod nozzle; a wire rod feeding unit configured to feed a wire rod towards the core rod that has been drawn out from the core rod nozzle, the wire rod being fed in a direction intersecting with a drawing direction of the core rod; a rotator into which the core rod nozzle is inserted, the rotator being capable of rotating about the core rod nozzle; a guide member provided on an end portion of the rotator with shift respect to a center of the rotator, the guide member being configured to clamp, with the core rod, the wire rod that has been fed from the wire rod feeding unit; and a rotating unit configured to rotate the rotator to rotate the guide member together with the rotator so as to revolve the wire rod around the core rod in a vicinity of the core rod nozzle.

According to another embodiment of the present invention, the coil winding is a winding method for winding the wire rod around the string-shaped core rod in a spiral manner, and in the coil winding method, the core rod is inserted through the core rod nozzle while applying a predetermined tension to the core rod, and the wire rod is revolved around the core rod in the vicinity of the core rod nozzle while drawing out the core rod from the core rod nozzle against the tension.

DESCRIPTION OF EMBODIMENTS

Next, a coil winding apparatus and a coil winding method according to an embodiment of the present invention will be described with reference to the drawings.

Figure 10:
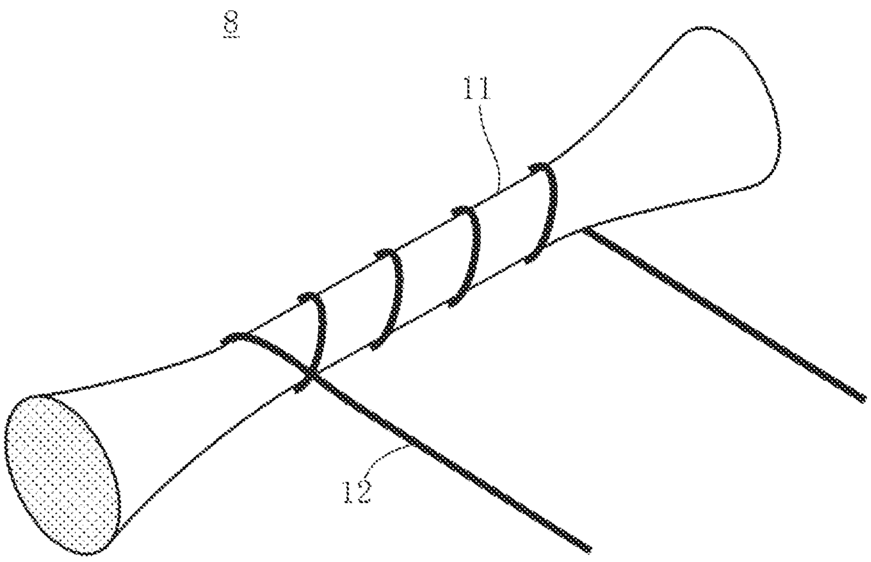
FIG. 10 is a perspective view of a coil formed by winding the wire rod around the core rod in a spiral manner.

FIG. 10 shows a coil 8 obtained by the present embodiment. The coil 8 forms, for example, a heater element of an electronic cigarette. Specifically, the coil 8 is formed by winding a wire rod 12 around a core rod 11 in a spiral manner. The core rod 11 in the present embodiment is a member that is formed into a string shape by binding a bundle of heat resistive fibers such as glass fibers. The wire rod 12 is, for example, a Nichrome wire made of a high resistivity alloy, and its rigidity is higher than the core rod 11.

In the heater element of the electronic cigarette, if there is a gap between the wire rod 12 and the core rod 11 or if the core rod 11 is squeezed too much, a liquid is not supplied around the wire rod 12 sufficiently. As a result, there is a possibility that the wire rod 12 is burned. For such a reason, it is required to wind the wire rod 12 in moderate close contact without gaps around the core rod 11. Further, the string-shaped core rod 11 is soft and has an unstable diameter. When the diameter of the core rod 11 is varied, which has been formed by winding the wire rod 12 in moderate close contact without gaps around the core rod 11, is also varied. As the inner diameter of the spiral member is varied, a length of the wire rod 12 is also varied, and in turn, the electrical resistance is varied. Thus, it is important to control the inner diameter of the spiral member (an electrical resistance control). In the heater element of the electronic cigarette, the electrical resistance of the wire rod 12 is a factor that determines an amount and taste of a liquid smoke, and the electrical resistance control is extremely important.

According to the present embodiment, the relatively rigid wire rod 12 may be wound around the relatively soft string-shaped core rod 11 in a spiral manner. Further, according to the present embodiment, the wire rod 12 may be wound around the core rod 11 at the same inner diameter in a spiral manner without forming a gap between the core rod 11 and the wire rod 12.

Figure 1:
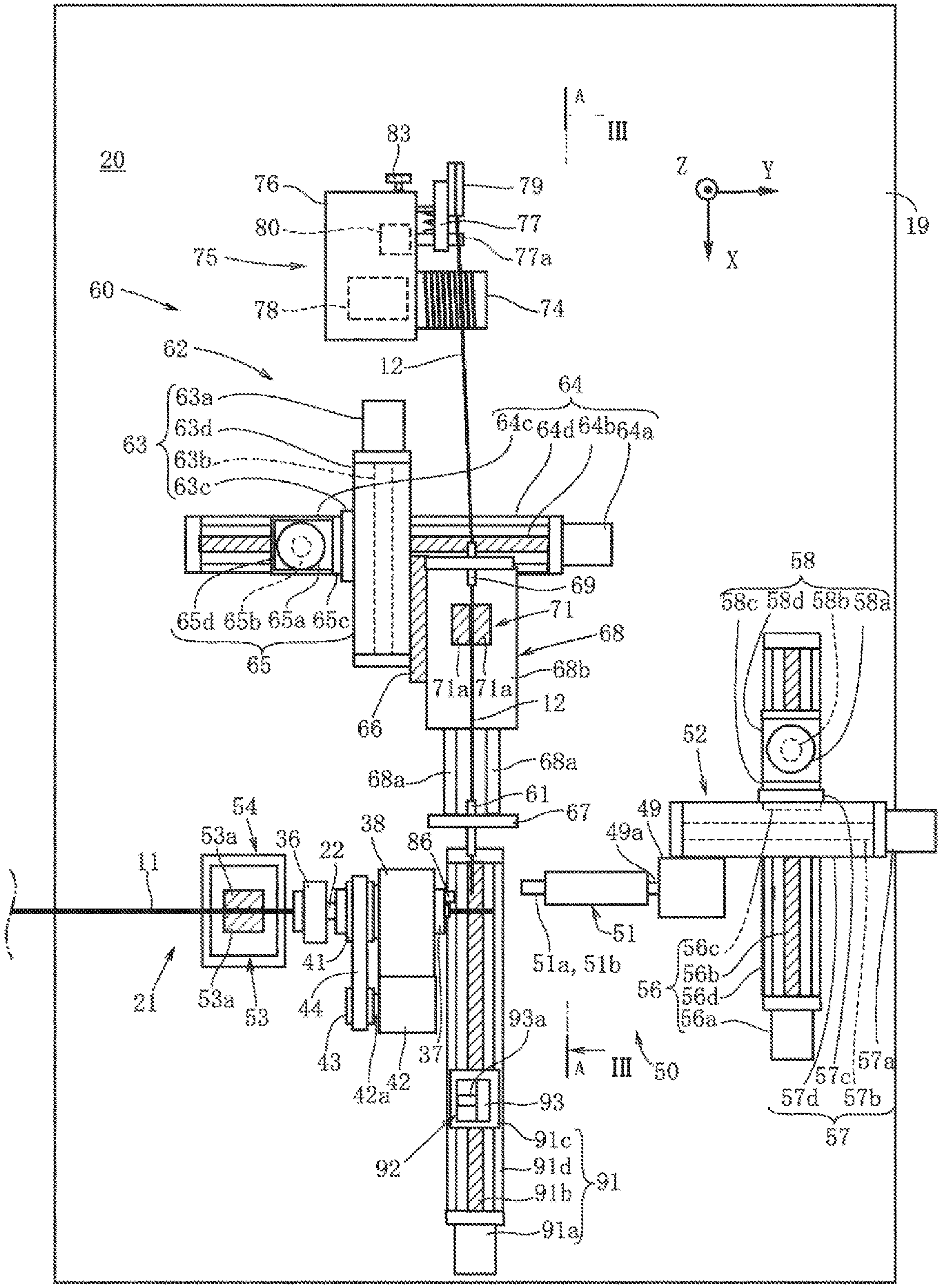
FIG. 1 is a plan view showing a coil winding apparatus of an embodiment according to the present invention.
Figure 2:
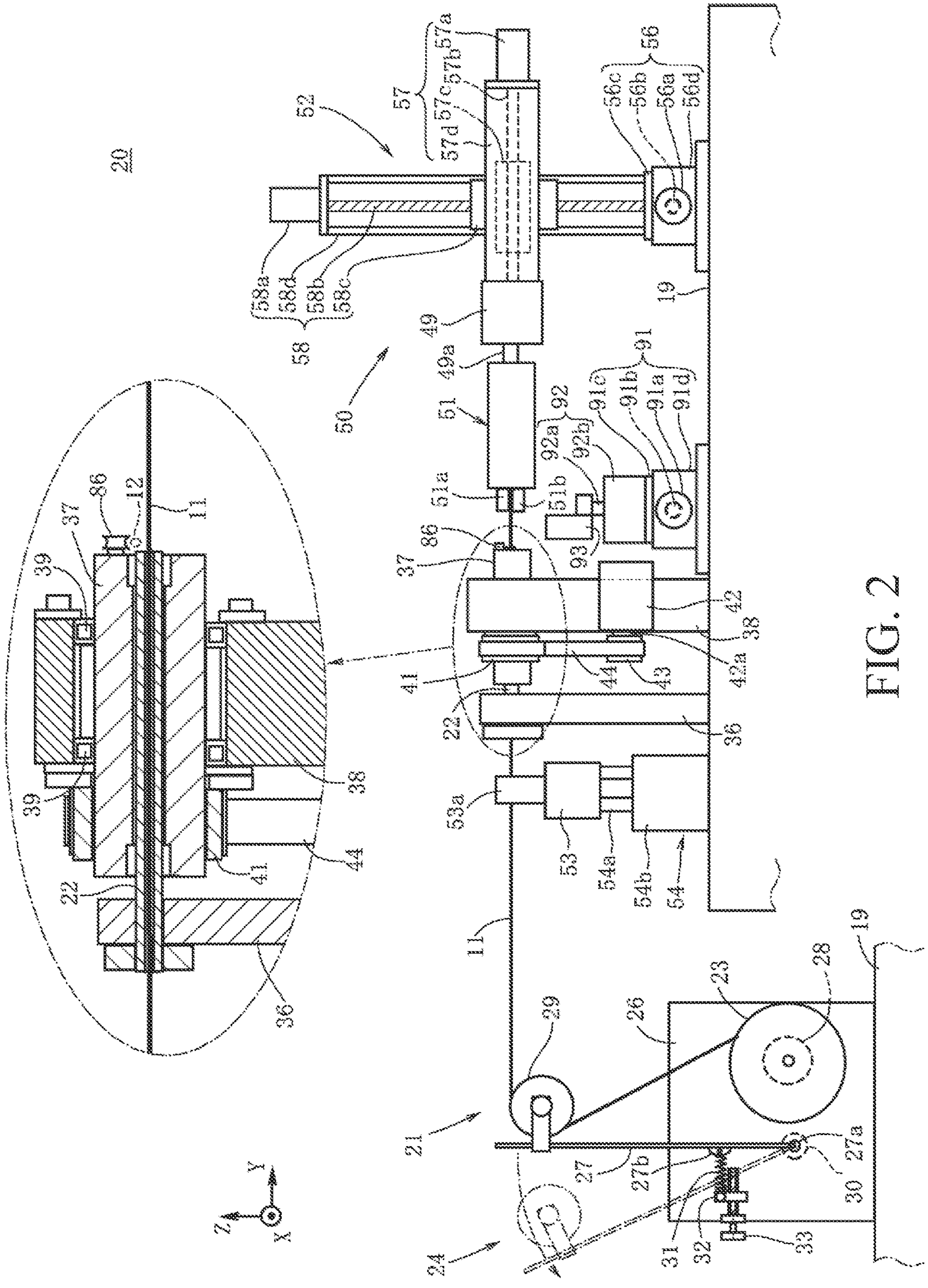
FIG. 2 is a front view of the coil winding apparatus shown in FIG. 1.
Figure 3:
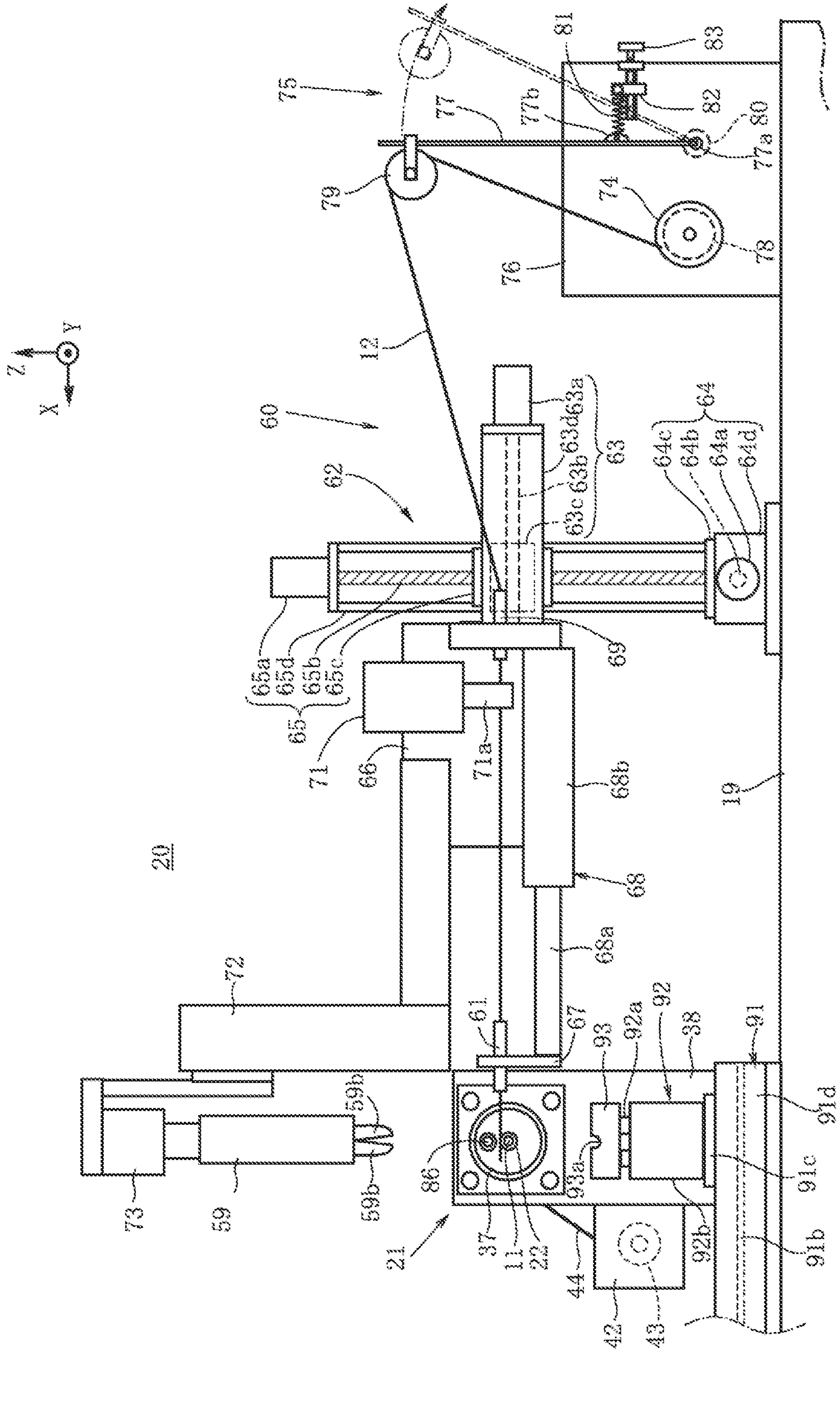
FIG. 3 is a sectional view taken along a line III-III in FIG. 1 and shows a state in which a wire rod has been fed towards a core rod from the direction intersecting the core rod.

FIGS. 1 to 3 show a coil winding apparatus 20 according to the present embodiment. In the figures, the X axis, the Y axis and, the Z axis that are orthogonal to each other are set, and the configuration of the coil winding apparatus 20 will be described. The X axis is an axis extending in the substantially horizontal longitudinal direction, the Y axis is an axis extending in the substantially horizontal transverse direction, and the Z axis is an axis extending in the substantially vertical direction.

The coil winding apparatus 20 is provided with core rod feeding unit 21 that feeds the string-shaped core rod 11 made of a bundle of fibers from a core rod nozzle 22 at a constant tension. As shown in FIG. 2, the core rod 11 is stored by being wound on a core rod spool 23, and the core rod 11 is guided to the core rod nozzle 22 by being unwound from the core rod spool 23. A core rod tension device 24 for applying the constant tension to the core rod 11 is provided between the core rod spool 23 and the core rod nozzle 22.

The core rod tension device 24 is configured so as to be capable of applying the tension to the core rod 11 and pulling back the core rod 11. The core rod tension device 24 is provided with a casing 26 that is provided on a mounting 19 and a tension bar 27 that is provided on a side surface of the casing 26 in the X axis direction so as to extend along the side surface.

The core rod spool 23 is provided on the side surface of the casing 26 in the X axis direction. A feeding control motor 28 that rotates the core rod spool 23 to feed the core rod 11 is provided in the inside of the casing 26. A core rod guide pulley 29 is provided on a distal end of the tension bar 27. The core rod 11 is fed from the core rod spool 23 and guided to the core rod guide pulley 29, and thereby, the core rod 11 is wired from the core rod guide pulley 29 so as to be inserted through the core rod nozzle 22.

A turning shaft 27*a* that extends in the X axis direction is provided on a proximal end of the tension bar 27, and the tension bar 27 is configured so as to be able to turn about the turning shaft 27*a*. The turning angle of the turning shaft 27*a* is detected by a potentiometer 30 serving as turning angle detection means that is accommodated in the casing 26 and mounted to the turning shaft 27*a*. A detection output from the potentiometer 30 is input to a controller (not shown), and a control output from the controller is linked to the feeding control motor 28.

At a predetermined position between the turning shaft 27*a* of the tension bar 27 and the core rod guide pulley 29, a spring 31 that is an elastic member serving as biasing means is mounted at one end thereof via a mounting bracket 27*b*. The spring 31 biases the tension bar 27 towards the turning direction of the tension bar 27. The tension bar 27 receives an elastic force from the spring 31 correspondingly to the turning angle. Other end of the spring 31 is fixed to a moving member 32. The moving member 32 is screwed to a tension adjusting screw 33 and is configured such that the movement thereof can be adjusted in accordance with rotation of the tension adjusting screw 33. In other words, the position at which the other end of the spring 31 is fixed can be changed, and thereby, the tension of the core rod 11 that is applied by the tension bar 27 can be adjusted.

The controller (not shown) is configured so as to control the feeding control motor 28 such that the turning angle detected by the potentiometer 30 becomes a predetermined angle. Therefore, in the core rod tension device 24, the tension is applied to the core rod 11 by the spring 31 via the tension bar 27, and the core rod spool 23 is rotated such that the turning angle of the tension bar 27 becomes a predetermined angle, and thereby, the core rod 11 is fed at a predetermined amount. Thus, the tension of the core rod 11 is maintained at a predetermined level.

As shown in an enlarged view in FIG. 2, the core rod nozzle 22 in the present embodiment is a straight cylindrical member having an inner diameter smaller than an outer diameter of the core rod 11 in a natural state. The core rod nozzle 22 extends in the Y axis direction, and a proximal end of the core rod nozzle 22 is mounted to a first support pillar 36 erected on the mounting 19. The inner diameter of the core rod nozzle 22 is set such that the core rod 11 that has been stretched and its outer diameter has been suitably reduced can pass through.

The coil winding apparatus 20 is provided with a rotator 37 into which the core rod nozzle 22 is inserted. The rotator 37 rotates about the core rod nozzle 22. Specifically, a second support pillar 38 erects on the mounting 19 so as to be separated away from the first support pillar 36 in the Y axis direction, and the rotator 37 having a cylindrical shape is provided on the second support pillar 38. The core rod nozzle 22 is inserted through the rotator 37 having the cylindrical shape. The rotator 37 is provided on the second support pillar 38 via a bearing 39 so as to be rotatable about the core rod nozzle 22.

The rotator 37 projects from the second support pillar 38 towards the first support pillar 36. A pulley 41 is fitted to a projecting end of the rotator 37. A motor 42 serving as a rotating means that rotates the rotator 37 is provided on the second support pillar 38. The motor 42 has a rotating shaft 42*a* that is in parallel with the rotator 37. In addition to the pulley 41, a pulley 43 is provided on the rotating shaft 42*a* of the motor 42. The motor 42 may be provided on the mounting 19.

A belt 44 is suspended between the pulley 41 of the rotator 37 and the pulley 43 on the rotating shaft 42*a* of the motor 42. As the motor 42 is driven, rotation of the rotating shaft 42*a* is transmitted to the rotator 37 via the belt 44, and the rotator 37 is rotated.

As shown in FIGS. 1 and 2, the coil winding apparatus 20 is provided with a core rod drawing unit 50 that holds the core rod 11, which has been inserted through the core rod nozzle 22, and that draws out the core rod 11 from the core rod nozzle 22. The core rod drawing unit 50 in the present embodiment is provided with a core rod holding device 51 that is configured such that a pair of clamping blocks 51*a* and 51*b* are opened and closed by a fluid pressure and the core rod 11 can be held by the clamping blocks 51*a* and 51*b*, a motor 49 that rotates the core rod holding device 51 about the core rod 11 that has been held, and a core-rod-holding-device moving mechanism 52 that is capable of moving the core rod holding device 51, together with the motor 49, in three axial directions.

The core-rod-holding-device moving mechanism 52 illustrated in FIGS. 1 and 2 is configured by combining X axis, Y axis, and Z axis direction telescopic actuators 56 to 58. In other words, the telescopic actuators 56 to 58 have, respectively, elongated box-shaped housings 56*d* to 58*d*, ball screws 56*b* to 58*b* that are provided so as to extend in the housings 56*d* to 58*d* in the lengthwise directions and that are respectively rotationally driven by servo motors 56*a* to 58*a*, and followers 56*c* to 58*c* that are respectively screwed to the ball screws 56*b* to 58*b* and undergo translation movement.

In the present embodiment, the core rod holding device 51 is mounted to a rotating shaft 49*a* of the motor 49, the motor 49 is mounted to the housing 57*d* of the Y axis direction telescopic actuator 57 so as to be able to move the core rod holding device 51 in the Y axis direction, and the follower 57*c* of the Y axis direction telescopic actuator 57 is mounted to the follower 58*c* of the Z axis direction telescopic actuator 58 so as to be able to move, together with the Y axis direction telescopic actuator 57, the core rod holding device 51 in the Z axis direction. Further, the housing 58*d* of the Z axis direction telescopic actuator 58 is mounted to the follower 56*c* of the X axis direction telescopic actuator 56 so as to be able to move, together with the Y axis and Z axis direction telescopic actuators 57 and 58, the core rod holding device 51 in the X axis direction. The housing 56*d* of the X axis direction telescopic actuator 56 is fixed to the mounting 19 so as to extend in the X axis direction.

The servo motors 56*a* to 58*a* in the telescopic actuators 56 to 58 are connected to a controller (not shown), and they are controlled by the controller. In other words, with the telescopic actuators 56 to 58, as the servo motors 56*a* to 58*a* are driven by commands from the controller (not shown), the ball screws 56*b* to 58*b* are rotated, and thereby, the followers 56*c* to 58*c* screwed to the ball screws 56*b* to 58*b* are moved along the lengthwise direction of the housings 56*d* to 58*d*. As the followers 56*c* to 58*c* are moved, the core rod holding device 51 is moved in three axial directions.

The core rod holding device 51 with the pair of opening clamping blocks 51*a* and 51*b* is moved such that the core rod 11 projecting from a distal end of the core rod nozzle 22 is positioned between the pair of clamping blocks 51*a* and 51*b*, and thereafter, the pair of clamping blocks 51*a* and 51*b* are closed to hold the core rod 11 with the pair of clamping blocks 51*a* and 51*b*. In addition, by moving the core rod holding device 51 in the direction away from the core rod nozzle 22 while holding the core rod 11, the core rod 11 is drawn out from the core rod nozzle 22. As described above, the core rod drawing unit 50 is configured so as to hold the core rod 11 inserted into the core rod nozzle 22 and draw the core rod 11 out from the core rod nozzle 22.

A core rod clamping tool 53 is provided on the mounting 19. In the core rod clamping tool 53, the core rod 11 extending from the core rod tension device 24 to the core rod nozzle 22 is clamped by clamping blocks 53*a* at the vicinity of the first support pillar 36, thereby prohibiting the movement of the core rod 11 towards the core rod nozzle 22.

The core rod clamping tool 53 shown in FIG. 2 is a so-called fluid pressure cylinder. Specifically, in the core rod clamping tool 53, the pair of clamping blocks 53*a* are moved so as to be separated away from each other or so as to come closer with each other by using fluid pressure. By moving the pair of clamping blocks 53*a* so as to come closer with each other in a state in which the core rod 11 is passed through between the separated pair of clamping blocks 53*a*, the core rod 11 is claimed. In the core rod clamping tool 53, a main body 54*b* is mounted to an upper end of a retracting shaft 54*a* of a fluid pressure cylinder 54 that is provided on the mounting 19 such that the retracting shaft 54*a* is orientated vertically. The fluid pressure cylinder 54 lowers the core rod clamping tool 53 that is not clamping the core rod 11. Thereby, the core rod clamping tool 53 is moved to a position where routing of the core rod 11 is not interfered.

As shown in FIGS. 1 and 3, the coil winding apparatus 20 is provided with a wire rod feeding unit 60 that feeds the wire rod 12 to the core rod 11 that has been inserted through and drawn out from the core rod nozzle 22. The wire rod 12 is fed in the direction orthogonal to the core rod nozzle 22. The wire rod feeding unit 60 is provided with a wire rod nozzle 61 through which the wire rod 12 is inserted and a wire-rod-nozzle moving mechanism 62 that moves the wire rod nozzle 61 in the three axial directions.

The wire-rod-nozzle moving mechanism 62 is configured so as to be capable of moving a support plate 66 in the three axial directions with respect to the mounting 19. The wire-rod-nozzle moving mechanism 62 has the same structure with that of the above-described core-rod-holding-device moving mechanism 52. Specifically, the wire-rod-nozzle moving mechanism 62 is provided with an X axis direction telescopic actuator 63 that moves the support plate 66 in the X axis direction, a Z axis direction telescopic actuator 65 that moves, together with the X axis direction telescopic actuator 63, the support plate 66 in the Z axis direction, and a Y axis direction telescopic actuator 64 that moves, together with the X axis and the Z axis direction telescopic actuator 63 and 65, the support plate 66 in the Y axis direction.

The support plate 66 is mounted to a housing 63*d* of the X axis direction telescopic actuator 63. A follower 63*c* of the X axis direction telescopic actuator 63 is mounted to a follower 65*c* of the Z axis direction telescopic actuator 65. A housing 65*d* of the Z axis direction telescopic actuator 65 is mounted to a follower 64*c* of the Y axis direction telescopic actuator 64. A housing 64*d* of the Y axis direction telescopic actuator 64 is fixed to the mounting 19 so as to extend in the Y axis direction. Servo motors 63*a* to 65*a* in the telescopic actuators 63 to 65 are connected to a controller (not shown) that controls these components. The servo motors 63*a* to 65*a* respectively rotate ball screws 63*b* to 65*b* of the telescopic actuators 63 to 65.

The support plate 66 supports a fluid pressure cylinder 68. A main body portion 68*b* of the fluid pressure cylinder 68 is mounted to the support plate 66 such that an retracting rod 68*a* of the fluid pressure cylinder 68 extends in the X axis direction. A mounting plate 67 is mounted on a projecting end of the retracting rod 68*a*. The wire rod nozzle 61 is mounted on the mounting plate 67 so as to face towards the X axis direction.

In addition, the support plate 66 supports a proximal end nozzle 69 that is provided coaxially with the wire rod nozzle 61 and a wire rod clamping tool 71 that is provided in the vicinity of the proximal end nozzle 69. In the wire rod clamping tool 71, a pair of clamping blocks 71*a* clamp the wire rod 12 that has passed through the proximal end nozzle 69 towards the wire rod nozzle 61 so as to be releasable. Because a fluid pressure cylinder having the same structure as that of the core rod clamping tool 53 that clamps the core rod 11 is used for the wire rod clamping tool 71, detailed descriptions of the wire rod clamping tool 71 will be omitted.

As shown in FIG. 3, in addition to the fluid pressure cylinder 68 and the wire rod clamping tool 71, the support plate 66 supports a cutter device 59. The cutter device 59 uses air pressure to cut the wire rod 12 that has passed through the wire rod nozzle 61 and the core rod 11 that has passed through the core rod nozzle 22. The cutter device 59 is mounted on a rotating cylinder 73, the rotating cylinder 73 is mounted on an elevating cylinder 72, and the elevating cylinder 72 is mounted on the support plate 66. The elevating cylinder 72 is driven by a command from a controller (not shown) to move the rotating cylinder 73 and the cutter device 59 up and down. The rotating cylinder 73 rotates the cutter device 59 about the vertical axis.

The cutter device 59 is lowered by the elevating cylinder 72, and thereby, cutter blades 59*b* are moved to cutting positions for cutting the wire rod 12 and the core rod 11. In addition, the cutter device 59 is lifted by the elevating cylinder 72, and thereby, the cutter blades 59*b* are moved to a stand-by position away from the wire rod 12 and the core rod 11. The cutter device 59 is rotated by the rotating cylinder 73 about the vertical axis, and thereby, the cutter device 59 is switched from a wire rod cutting orientation in which the cutter blades 59*b* pinch and cut the wire rod 12 to a core rod cutting orientation in which the cutter blades 59*b* pinch and cut the core rod 11 extending orthogonal to the wire rod 12.

As shown in FIGS. 1 and 3, similarly to the core rod 11, the wire rod 12 is stored by being wound on a wire rod spool 74. The wire rod 12 that is unwound and fed from the wire rod spool 74 is inserted through the proximal end nozzle 69 and the wire rod nozzle 61 in this order. The coil winding apparatus 20 is provided with a wire rod tension device 75 that applies a predetermined tension to the wire rod 12 that has been unwound from the wire rod spool 74.

The wire rod tension device 75 in the present embodiment has substantially the same structure as the structure of the core rod tension device 24 (see FIG. 2) that applies a predetermined tension to the core rod 11. In other words, the wire rod tension device 75 is provided with a casing 76 that is provided on the mounting 19 and a tension bar 77 that is provided on a side surface of the casing 76 in the Y axis direction so as to extend along the side surface. The wire rod spool 74 is provided on the side surface of the casing 76. A feeding control motor 78 that rotates the wire rod spool 74 is provided in an interior of the casing 76. A wire rod guide pulley 79 is provided on a distal end of the tension bar 77. A rotating shaft 77*a* is provided on a proximal end of the tension bar 77, and a potentiometer 80 that detects the turning angle of the rotating shaft 77*a* is provided in the casing 76.

As shown in FIG. 3, one end of a spring 81 is mounted on the tension bar 77 via a mounting bracket 77*b*. Other end of the spring 81 is fixed to a moving member 82. The moving member 82 is screwed to a tension adjusting screw 83 and is configured such that the movement thereof can be adjusted in accordance with rotation of the tension adjusting screw 83.

In other words, in the wire rod tension device 75, the tension is applied to the wire rod 12 by the spring 81 via the tension bar 77. In addition, the wire rod spool 74 is rotated by controlling the feeding control motor 78 such that the tension bar 77 is oriented in a predetermined angle, in other words, such that the turning angle detected by the potentiometer 80 becomes a predetermined angle, and the wire rod 12 is fed at a predetermined amount. Thereby, the tension of the wire rod 12 is maintained at a predetermined level.

Figure 4:
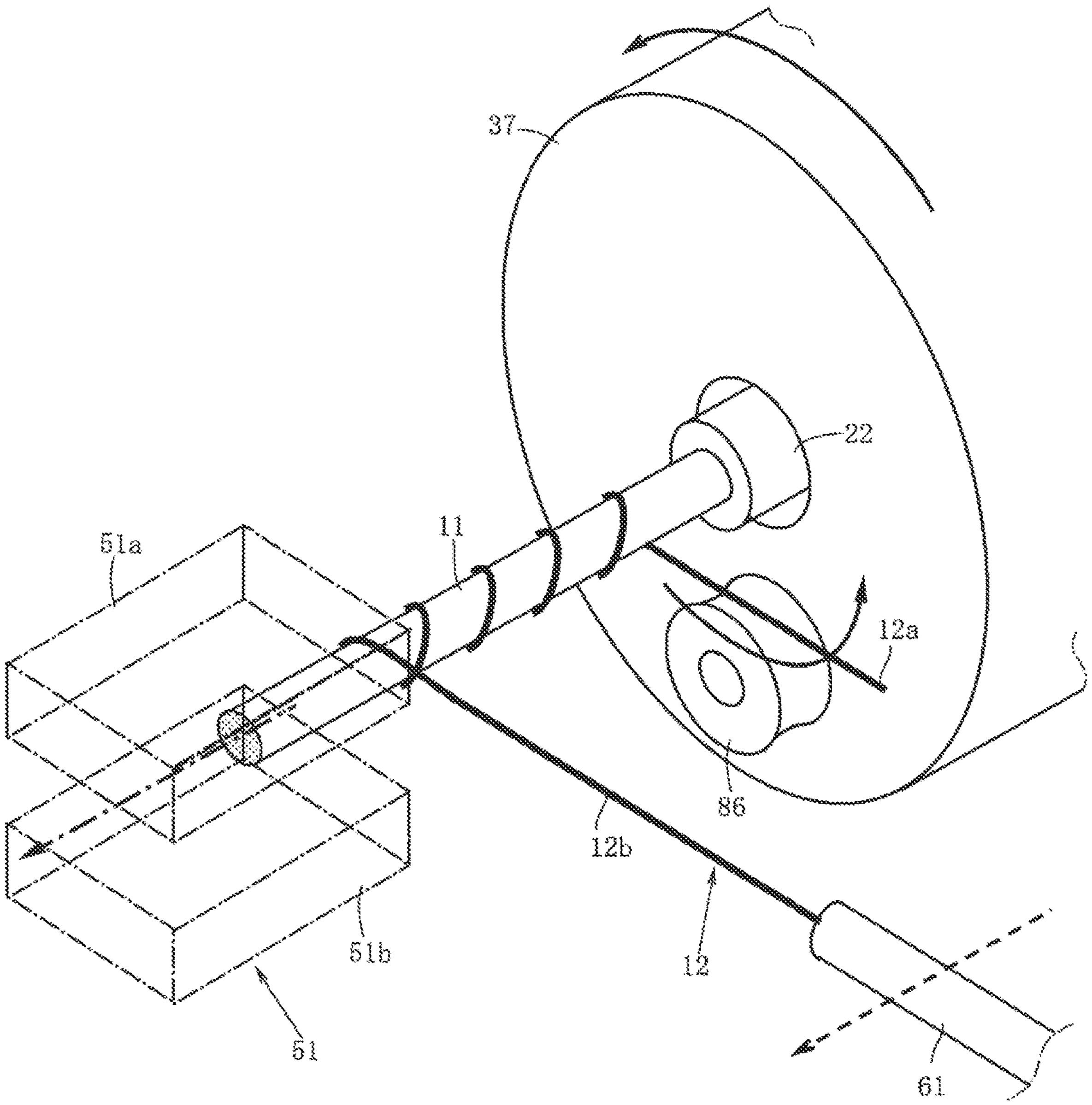
FIG. 4 is a perspective view showing a state in which the wire rod is wound around the core rod in a spiral manner by the coil winding apparatus.

As shown in FIGS. 1 to 3, the core rod 11 is fed from a feeding-side end portion of the rotator 37 into which the core rod nozzle 22 is inserted. A guide member 86 is provided on the feeding-side end portion of the rotator 37 with shift respect to the rotation center of the feeding-side end portion. The guide member 86 clamps the wire rod 12 that has been fed from the wire rod feeding unit 60 with the core rod 11 that has been drawn out from the core rod nozzle 22. As the motor 42 serving as the rotating means rotates the rotator 37, as shown in FIG. 4, the guide member 86 is rotated together with the rotator 37, and thereby, the wire rod 12 that is clamped with the core rod 11 is guided around and rubbed and placed onto the core rod 11 in the vicinity of the core rod nozzle 22. Thus, the wire rod 12 revolves around the core rod 11. The phrase "in the vicinity of the core rod nozzle 22" means, for example, a region from a feeding-side end portion of the core rod nozzle 22 to the center of a gap between the core rod nozzle 22 and the pair of clamping blocks 51*a* and 51*b*.

As shown in FIG. 4, the guide member 86 in the present embodiment is a pulley that is pivotably supported on an end portion of the rotator 37. The pulley can easily guide the wire rod 12 around the core rod 11 in the vicinity of the core rod nozzle 22 by being rotated in a state in which the wire rod 12 is suspended.

As shown in FIGS. 1 to 3, a receiving tool 93 is provided under the feeding-side end portion of the core rod nozzle 22. The receiving tool 93 receives the coil 8 that is formed by winding the wire rod 12 around the core rod 11 in a spiral manner. The receiving tool 93 is mounted on a fluid pressure cylinder 92, and the fluid pressure cylinder 92 is mounted on a follower 91*c* of a telescopic actuator 91. A housing 91*d* of the telescopic actuator 91 is mounted on the mounting 19 so as to extend in the X axis direction.

A main body 92*b* of the fluid pressure cylinder 92 is mounted on the follower 91*c* of the telescopic actuator 91 such that an retracting shaft 92*a* of the fluid pressure cylinder 92 faces upwards. The receiving tool 93 is mounted on an upper end of the retracting shaft 92*a* of the fluid pressure cylinder 92. A recessed groove 93*a* capable of receiving the coil 8 (see FIG. 10) is formed on a top portion of the receiving tool 93 so as to be in parallel with the feeding direction of the core rod 11. In a state in which the coil 8 is received in the recessed groove 93*a*, the receiving tool 93 is lowered by the fluid pressure cylinder 92 and is further moved in the X axis direction by the telescopic actuator 91, and thereby, the coil 8 thus obtained can be taken out to the outside.

Next, a coil winding method of the present invention will be described.

In the coil winding method of the present invention, the wire rod 12 is wound around the string-shaped core rod 11 in a spiral manner. The coil winding method is characterized in that the core rod 11 is inserted through the core rod nozzle 22 while applying a predetermined tension to the core rod 11, and the wire rod 12 is revolved around the core rod 11 in the vicinity of the core rod nozzle 22 while drawing out the core rod 11 from the core rod nozzle 22 against a tensile force.

The coil winding method is performed on the above-described coil winding apparatus 20. In other words, as shown in FIG. 4, in the coil winding apparatus 20, the wire rod 12 is fed from the direction orthogonal to the core rod 11 that has been drawn out from the core rod nozzle 22, the wire rod 12 is clamped by the core rod 11 and the guide member 86 in the vicinity of the core rod nozzle 22, and the guide member 86 is rotated about the core rod 11. By doing so, a distal-end side wire rod 12*a* extending beyond the guide member 86 is continuously suspended on the guide member 86 and is revolved around the core rod 11.

A procedure of the coil winding method will be described specifically. The core rod 11 and the wire rod 12 are first installed to the coil winding apparatus 20. As shown in FIG. 2, the core rod 11, which is wound and stored on the core rod spool 23, is prepared, and the core rod spool 23 is mounted on the side surface of the casing 26 in the core rod tension device 24 such that the feeding control motor 28 can rotate the core rod spool 23. The core rod 11 that has been unwound from the core rod spool 23 is guided to the core rod guide pulley 29 of the distal end of the tension bar 27 and inserted through the core rod nozzle 22.

The core rod nozzle 22 in the present embodiment is a straight cylindrical member that has the inner diameter smaller than the outer diameter of the core rod 11 in the natural state. The core rod 11 is inserted through the core rod nozzle 22 in a state in which the core rod 11 is stretched such that the outer diameter thereof is reduced suitably. In this state, the core rod clamping tool 53 mounted on the mounting 19 is used to clamp the core rod 11, thereby prohibiting the movement of the core rod 11. Thus, even if the core rod 11 is pulled by the core rod tension device 24, the core rod 11 is prevented from been pulled back from the core rod nozzle 22.

As shown in FIG. 3, the wire rod 12 that has been wound and stored on the wire rod spool 74 is prepared, and the wire rod spool 74 is mounted on the side surface of the casing 76 of the wire rod tension device 75 such that the feeding control motor 78 can rotate the wire rod spool 74. The wire rod 12 that has been unwound from the wire rod spool 74 is guided to the wire rod guide pulley 79 on the distal end of the tension bar 77 and is inserted through the proximal end nozzle 69 and the wire rod nozzle 61 in this order.

The wire rod nozzle 61 is mounted on the support plate 66 via the fluid pressure cylinder 68. The wire rod 12 is inserted through the wire rod nozzle 61 in a state in which the retracting rod 68*a* of the fluid pressure cylinder 68 is projected from the main body portion 68*b*. A projecting amount of the wire rod 12 from the wire rod nozzle 61 is set to a length required for allowing the core rod 11 and the wire rod 12 to intersect with each other. In this state, the wire rod clamping tool 71 provided on the support plate 66 is used to clamp the wire rod 12, thereby prohibiting the movement of the wire rod 12. Thus, even if the wire rod 12 is pulled by the wire rod tension device 75 towards the wire rod tension device 75, the wire rod 12 is prevented from been pulled back from the wire rod nozzle 61.

In addition, the motor 42 serving as the rotating means is driven to rotate the rotator 37, and thereby, the guide member 86 provided on a tip end of the rotator 37 is positioned on an imaginary place that is in parallel with the core rod 11 and orthogonal to the feeding direction of the wire rod 12 (above the core rod 11 in FIG. 3). The wire rod 12 is then moved so as to intersect with the core rod 11 from the direction intersecting with the core rod 11 that has been inserted through and drawn out from the core rod nozzle 22. The movement of the wire rod 12 is achieved by the wire-rod-nozzle moving mechanism 62. Specifically, the wire rod nozzle 61 is moved together with the wire rod clamping tool 71, and as shown in FIG. 3, the wire rod 12 that is projecting from the wire rod nozzle 61 is made to intersect with the core rod 11 in the vicinity of the core rod nozzle 22 by causing the wire rod 12 to enter a gap between the guide member 86 and the core rod 11 that is inserted through the core rod nozzle 22.

Next, as shown in FIG. 2, the core rod 11 that has been fed from the core rod nozzle 22 is held by the core rod drawing unit 50. Specifically, in a state in which the pair of clamping blocks 51*a* and 51*b* are separated, the core rod holding device 51 is moved by the core-rod-holding-device moving mechanism 52 to a position opposing to the distal end of the core rod nozzle 22, and thereby, the core rod 11 is positioned between the pair of clamping blocks 51*a* and 51*b*. Thereafter, the pair of clamping blocks 51*a* and 51*b* are closed, and the core rod 11 projecting from the distal end edge of the core rod nozzle 22 is clamped by the pair of clamping blocks 51*a* and 51*b*.

By releasing the core rod 11 from the state held by the core rod clamping tool 53 provided on the mounting 19, the feeding of the core rod 11 is allowed. By holding the core rod 11 that has been fed from the core rod nozzle 22 by the core rod drawing unit 50, even if the core rod 11 is pulled by the core rod tension device 24, the core rod 11 is prevented from been pulled back from the core rod nozzle 22.

Figure 5:
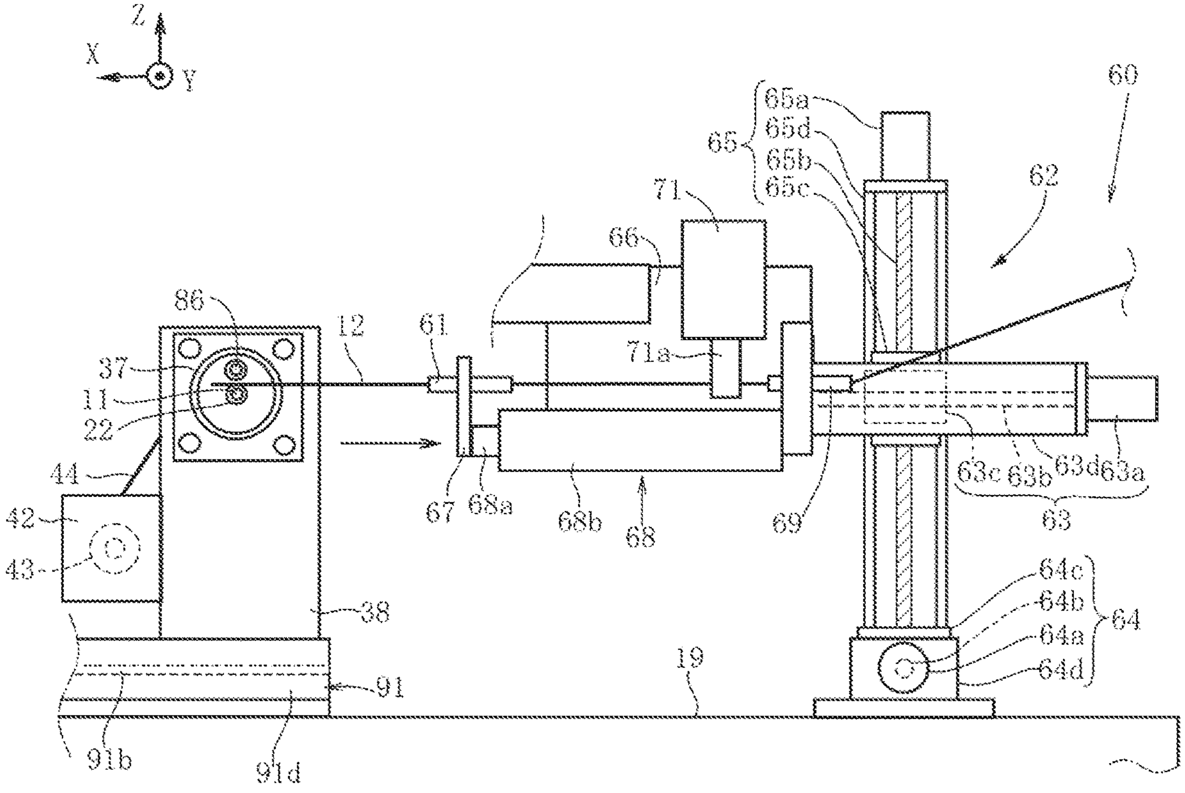
FIG. 5 is a diagram corresponding to FIG. 3 and shows a state in which the wire rod is projected from a wire rod nozzle by moving the wire rod nozzle that has fed the wire rod away from the core rod.

Next, as shown in FIG. 5, the retracting rod 68*a* on which the wire rod nozzle 61 of the fluid pressure cylinder 68 is mounted is moved into the main body portion 68*b*, and thereby, the wire rod nozzle 61 is moved closer to the wire rod clamping tool 71 clamping the wire rod 12. Thereby, the wire rod 12 having the length required for a subsequent winding is drawn out to a gap between the core rod 11 in the vicinity of the core rod nozzle 22 and the wire rod nozzle 61.

Figure 6:
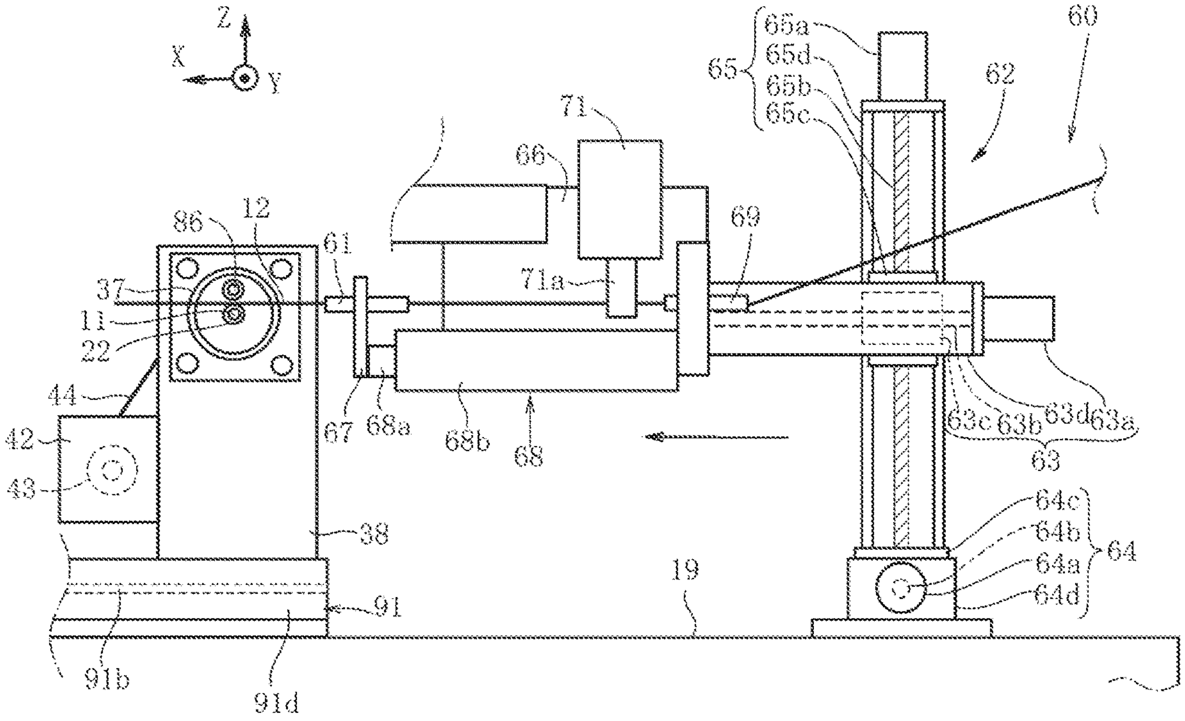
FIG. 6 is a diagram corresponding to FIG. 5 and shows a state in which the wire rod is intersecting with the core rod by moving, together with the wire rod, the wire rod nozzle from which the wire rod is projecting.

Next, as shown in FIG. 6, the wire rod clamping tool 71 and the wire rod nozzle 61 are, together with the wire rod 12, brought closer to the core rod 11 by the wire-rod-nozzle moving mechanism 62, and thereby, the wire rod 12 that has been fed from the core rod nozzle 22 by the length required for winding is inserted between the guide member 86 and the core rod 11 so as to intersect with the core rod 11.

Figure 7:
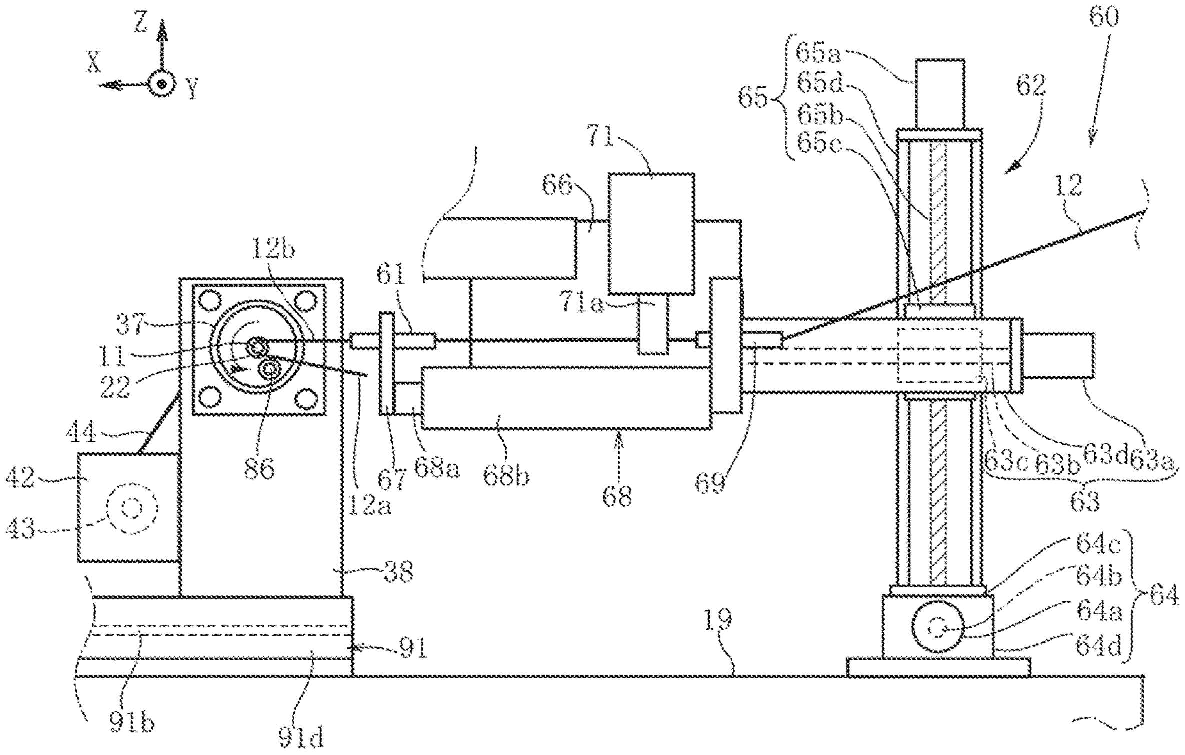
FIG. 7 is a diagram corresponding to FIG. 6 and shows a state in which the wire rod is suspended on the core rod by being turned.

Next, as shown in FIG. 7, the motor 42 serving as the rotating means is driven to rotate the rotator 37 by 180 degrees. The guide member 86 being rotated and moved comes into contact with the distal-end side wire rod 12*a* inserted between the guide member 86 and the core rod 11, and thereby, the distal-end side wire rod 12*a* is suspended around the core rod 11 in a U shape. In this state, even if the wire rod 12 is pulled by the wire rod tension device 75 towards the wire rod tension device 75, the wire rod 12 is prevented from been pulled back. In this state, by releasing the wire rod 12 from the state clamped by the wire rod clamping tool 71 provided on the support plate 66, the feeding of the wire rod 12 is allowed.

Figure 8:
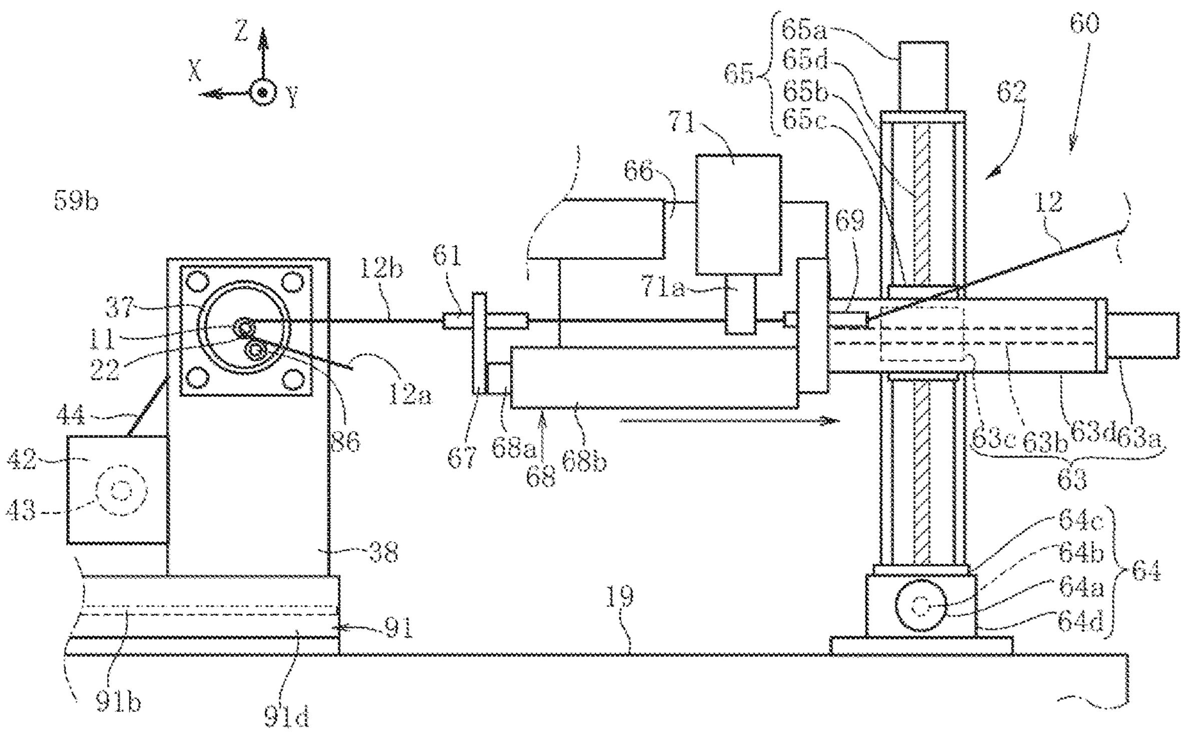
FIG. 8 is a diagram corresponding to FIG. 7 and shows a state in which the wire rod nozzle is moved away from the core rod again, and another portion of the wire rod is fed.

Next, as shown in FIG. 8, by using the wire-rod-nozzle moving mechanism 62, the wire rod nozzle 61 is moved, together with the wire rod clamping tool 71, away from the core rod 11, and the wire rod 12 is further drawn out from the wire rod nozzle 61. After drawing out another portion of the wire rod 12 having the length required for a leader of the coil 8, the wire rod 12 is clamped again by the wire rod clamping tool 71.

Next, as shown in FIG. 4, while the core rod 11 is drawn out from the core rod nozzle 22, the guide member 86 is revolved around the core rod 11 for a required number of times. Drawing of the core rod 11 is performed by the core rod drawing unit 50 shown in FIG. 2. Specifically, the core rod holding device 51 holding the core rod 11 is moved away from the core rod nozzle 22, and thereby, as shown by a one-dot chain line arrow in FIG. 4, the core rod 11 is drawn out from the core rod nozzle 22.

While the core rod 11 is being drawn out, the guide member 86 is revolved around the core rod 11. The revolution of the guide member 86 is performed by rotating the rotator 37 by the motor 42 serving as the rotating means (FIG. 2) as shown by a solid line arrow in FIG. 4.

As the guide member 86 is revolved in the vicinity of the core rod nozzle 22, the distal-end side wire rod 12*a* passed through between the guide member 86 and the core rod 11 is continuously suspended on the guide member 86. As the guide member 86 on which the distal-end side wire rod 12*a* is suspended is further revolved around the core rod 11, the distal-end side wire rod 12*a* is continuously guided around the core rod 11 and is rubbed and placed onto the core rod 11. As a result, the distal-end side wire rod 12*a* is wound around the core rod 11.

The guide member 86 in the present embodiment is a pulley that is pivotably supported on an end portion of the rotator 37. Thus, the guide member 86 is rotated while the wire rod 12 is suspended and guides the distal-end side wire rod 12*a*. Therefore, it is possible to prevent occurrence of abrasion of the distal-end side wire rod 12*a* against the guide member 86 and to prevent occurrence of the surface damage of the wire rod 12 due to the abrasion. Because the wire rod 12 is wound while drawing out the core rod 11, the distal-end side wire rod 12*a* is wound around the core rod 11 that has been drawn out from the core rod nozzle 22 in a spiral manner.

In the above, the core rod nozzle 22 is a cylindrical member having the inner diameter that is smaller than the outer diameter of the core rod 11 in the natural state. Because the constant tension is applied to the core rod 11 by the core rod tension device 24 (FIG. 2), the relatively soft string-shaped core rod 11 is inserted through the core rod nozzle 22 in a state in which its outer diameter is reduced suitably by being pulled and is drawn out in a state in which it has a straight shape. Thus, in the vicinity of a drawing-side end portion of the core rod nozzle 22, the core rod 11 is prevented from being bent drastically. Even if the core rod 11 is soft, as long as the winding is performed on the core rod 11 in the vicinity of the drawing-side end portion of the core rod nozzle 22, it is possible to wind the relatively rigid wire rod 12. Thus, with the present embodiment, the relatively rigid wire rod 12 may be wound around the relatively soft string-shaped core rod 11 in a spiral manner.

A proximal-end side wire rod 12*b* that extends from the wire rod nozzle 61 to the core rod 11 does not pass through between the core rod 11 and the guide member 86, and so, it does not come into contact with the guide member 86. As shown in FIG. 8, the wire rod nozzle 61 that feeds the wire rod 12 is positioned away from the core rod 11. If the wire rod nozzle 61 is not moved in the drawing direction of the core rod 11, the proximal-end side wire rod 12*b* between the wire rod nozzle 61 and the core rod 11 is gradually tilted along with the drawing of the core rod 11.

In the present embodiment, as the core rod 11 is drawn out, the wire rod nozzle 61 from which the wire rod 12 is fed is moved by the wire-rod-nozzle moving mechanism 62 (FIG. 3) in the drawing direction of the core rod 11 as shown by a broken line arrow in FIG. 4 at the speed that is the same as a drawing speed. By moving the wire rod nozzle 61 in the drawing direction of the core rod 11 at the same speed, the intersecting angle between the proximal-end side wire rod 12*b* and the core rod 11 is kept constant. Therefore, it is possible to more stably wind the wire rod 12 in a spiral manner.

As shown in FIG. 4, after the distal-end side wire rod 12*a* that has been drawn out in advance and projected beyond the core rod 11 is wound around the core rod 11, the rotation of the rotator 37 is stopped and further winding of the wire rod 12 is prohibited. By using the core rod drawing unit 50 (FIG. 2), the core rod holding device 51 clamping the core rod 11 is moved further away from the core rod nozzle 22, and thereby, the core rod 11 is drawn out from the core rod nozzle 22 by a length required. Thereafter, the core rod 11 is held by the core rod clamping tool 53 provided upstream of the core rod nozzle 22, and thereby, the feeding of the core rod 11 is prohibited. In this state, the core rod 11 that has been held is released by the core rod holding device 51 of the core rod drawing unit 50.

In the above, during the winding of the wire rod 12, the core rod 11 is drawn out from the distal end of the core rod nozzle 22 in a state in which the constant tension is applied to the core rod 11, and the outer diameter of the core rod 11 during the winding is smaller than the outer diameter of the core rod 11 in the natural state and is relatively uniform. Therefore, the wire rod 12 is wound around the core rod 11 having the smaller outer diameter and having little variation in the outer diameter in the lengthwise direction.

After the winding, as the core rod 11 that has been held is released by the core rod holding device 51, the tension applied to the core rod 11 is removed. As a result, the core rod 11 returns to the natural state without the tension, and as shown in FIG. 10, the outer diameter of the core rod 11 is expanded. Because the wire rod 12 is wound in a spiral manner around an outer circumference of the core rod 11 having the small outer diameter, it is possible to achieve a state in which the wire rod 12 is brought into suitably close contact with an outer circumferential surface of the core rod 11 the outer diameter of which has been expanded and in which the wire rod 12 is wound in a spiral manner around the core rod 11 with substantially the same inner diameter.

Figure 9:
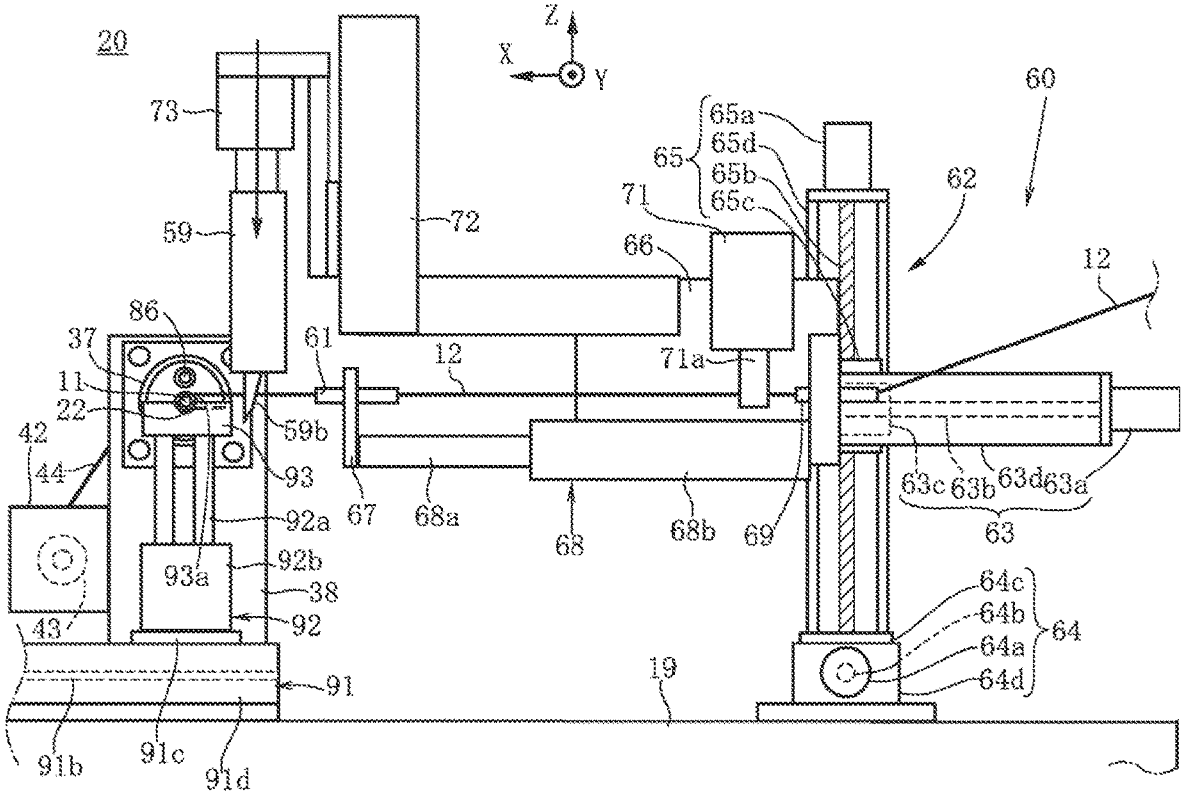
FIG. 9 is a diagram corresponding to FIG. 8 and shows a state in which the wire rod after it has been wound is cut.

After the winding is completed, as shown in FIG. 9, the wire rod 12 that has been clamped by the wire rod clamping tool 71 is released. Thereafter, the wire rod clamping tool 71 is moved away from the core rod 11 by the wire-rod-nozzle moving mechanism 62 and the retracting rod 68*a* with the wire rod nozzle 61 of the fluid pressure cylinder 68 is moved so as to project from the main body portion 68*b*.

The length of the wire rod 12 between the core rod 11 and the wire rod nozzle 61 is set to a length that is equal to a total of the length required for the leader of the coil 8 that is precedingly formed by winding the wire rod 12 around the core rod 11 in a spiral manner and the length of the wire rod 12 required for the subsequent winding. Thereafter, the wire rod 12 is held by the wire rod clamping tool 71 again, and thereby, the movement of the wire rod 12 is prohibited. In this state, the wire rod 12 is cut by lowering the cutter device 59 by the elevating cylinder 72 and moving it into the cutting position.

Next, the orientation of the cutter device 59 is changed by the rotating cylinder 73, and the cutter device 59 is moved by the wire-rod-nozzle moving mechanism 62. By cutting the core rod 11 around which the wire rod 12 is wound in a spiral manner at a predetermined length, the coil 8 shown in FIG. 10, in which the wire rod 12 is wound around the core rod 11 in a spiral manner, is obtained. When the core rod 11 is cut, it is preferable that the coil 8 shown in FIG. 10, in which the wire rod 12 is wound around the core rod 11 in a spiral manner, be received in the recessed groove 93*a* in the receiving tool 93 by positioning the receiving tool 93 under the core rod 11 and by lifting the receiving tool 93 by the fluid pressure cylinder 92.

Once the core rod 11 is cut, the coil 8 shown in FIG. 10, in which the wire rod 12 is wound around the core rod 11 in a spiral manner, is supported by the receiving tool 93 independently. A series of winding operation is finished by removing the coil 8 by moving the receiving tool 93 in the X axis direction from underneath the core rod nozzle 22 by the telescopic actuator 91, and the next winding operation is started. By doing so, it is possible to consecutively obtain the coil 8 shown in FIG. 10, in which the wire rod 12 is wound around the core rod 11 in a spiral manner.

In the above-mentioned embodiment, descriptions have been given on the core-rod-holding-device moving mechanism 52 and the wire-rod-nozzle moving mechanism 62 that are configured by combining the X axis, the Y axis, and the Z axis direction telescopic actuators. However, the structures of the core-rod-holding-device moving mechanism 52 and the wire-rod-nozzle moving mechanism 62 are not limited thereto, and other structures may also be employed as long as the core rod holding device 51, the wire rod nozzle 61, and so forth can be moved in the three axial directions with respect to the mounting 19.

In addition, in the above-mentioned embodiment, descriptions have been given on a case in which the tension bars 27 and 77 are tilted by the springs 31 and 81, respectively, and thereby, the tension is applied to the core rod 11 and the wire rod 12 by the core rod tension device 24 and the wire rod tension device 75, respectively. However, the structures of the core rod tension device 24 and the wire rod tension device 75 are not limited those described above, and other structures may also be employed. For example, the core rod tension device 24 and the wire rod tension device 75 may have structures in which the tension may be applied to the core rod 11 and/or the wire rod 12 by moving the core rod spool 23 and/or the wire rod spool 74 themselves/itself.

In addition, in the above-mentioned embodiment, a description has been given on a case in which the wire rod nozzle 61 is moved in the drawing direction of the core rod 11 at the same speed as the drawing speed when the wire rod 12 is wound. However, in a case in which the wire rod nozzle 61 feeding the wire rod 12 is sufficiently away from the core rod 11 and the tilting of the wire rod 12 caused along with the drawing of the core rod 11 may be allowed, the wire rod nozzle 61 may not necessarily be moved.

In addition, in the above-mentioned embodiment, a description has been given on a case in which the guide member 86 is the pulley that is pivotably supported on the end portion of the rotator 37. However, as long as the surface damage of the wire rod 12 due to the abrasion may be avoided, the guide member 86 may be a member that is not rotatable with respect to the rotator 37, for example, a pin shaped member in which a part coming into contact with the wire rod 12 has been polished in order to avoid the surface damage of the wire rod 12.

Furthermore, in the above-mentioned embodiment, a description has been given on a case in which the core rod 11 is drawn out in straight. However, if required, during the drawing of the core rod 11, it may be possible to draw out the core rod 11 while twisting it by rotating the core rod holding device 51 holding the core rod 11 by the motor 49. By drawing out the core rod 11 while twisting it, it is possible to further reinforce the core rod 11 around which the wire rod 12 is wound by being rubbed and placed thereonto, and at the same time, it is possible to further increase uniformity of the outer diameter. Therefore, it becomes possible to wind the wire rod 12 around the core rod 11 in a spiral manner so as to achieve more uniform inner diameter. In a case in which it is not required to twist the core rod 11, the motor 49 may not be installed.

The configurations, operations, and effects of the embodiments of the present invention will be collectively described below.

The coil winding apparatus is provided with: the core rod feeding unit configured to feed the string-shaped core rod from the core rod nozzle at the constant tension; the core rod drawing unit configured to draw out the core rod from the core rod nozzle against the tension by holding the core rod that has been fed from the core rod nozzle; the wire rod feeding unit configured to feed the wire rod towards the core rod that has been drawn out from the core rod nozzle in the direction intersecting therewith; the rotator into which the core rod nozzle is inserted, the rotator being capable of rotating about the core rod nozzle; the guide member provided on the end portion of the rotator with shift respect to the center of the rotator, the guide member being configured to clamp, with the core rod, the wire rod that has been fed from the wire rod feeding unit; and the rotating unit configured to rotate the rotator to rotate the guide member together with the rotator so as to revolve the wire rod around the core rod in the vicinity of the core rod nozzle.

The wire rod feeding unit is preferably provided with: the wire rod nozzle configured to feed the wire rod; the wire rod clamping tool configured to clamp the wire rod passing through the wire rod nozzle so as to be releasable; and an increasing/reducing unit configured to increase and reduce the gap between the wire rod nozzle and the wire rod clamping tool. The wire rod feeding unit may be further provided with the wire rod-nozzle moving mechanism configured to move at least the wire rod nozzle. The guide member is preferably the pulley pivotably supported on the end portion of the rotator, the guide member being configured such that the wire rod can be suspended.

The coil winding method, for winding the wire rod around the string-shaped core rod in a spiral manner, is characterized in that the core rod is inserted through the core rod nozzle while applying a predetermined tension to the core rod, and the wire rod is revolved around the core rod in the vicinity of the core rod nozzle while drawing out the core rod from the core rod nozzle against the tension.

It is preferable that: the wire rod be fed from the direction orthogonal to the core rod drawn out from the core rod nozzle; the wire rod be clamped by the guide member with the core rod in the vicinity of the core rod nozzle; and the guide member be rotated about the core rod, thereby the distal-end side wire rod be continuously suspended on the guide member and the distal-end side wire rod be continuously revolved around the core rod, the distal-end side wire rod being a part of the wire rod extending beyond the guide member. It is preferable that: the core rod nozzle be rotatably inserted into the rotator, and the guide member be provided on the drawing-side end portion of the rotator with shift respect to the center of the rotator; and the rotation of the guide member about the core rod be performed by rotating the rotator on which the guide member is provided.

It is preferable that: the proximal-end side wire rod be moved in the drawing direction of the core rod at substantially the same speed as the drawing speed of the core rod while drawing out the core rod from the core rod nozzle, the proximal-end side wire rod being a part of the wire rod not approaching the guide member.

With the coil winding apparatus and the coil winding method of the present embodiment, because the guide member is revolved in the vicinity of the core rod nozzle while drawing out the core rod from the core rod nozzle, the distal-end side wire rod passing through the gap between the guide member and the core rod is continuously suspended on the guide member, and the distal-end side wire rod is continuously guided to and wound around the core rod by the revolving guide member.

In the above, because the constant tension is applied to the core rod, the core rod is drawn out against the tension. Although the core rod is relatively soft, on a drawing end portion of the core rod nozzle, the core rod is prevented from being bent drastically. Therefore, in the vicinity of the drawing end portion of the core rod nozzle, by winding the wire rod around the core rod that has been drawn out, it becomes possible to wind the relatively rigid wire rod around the relatively soft core rod in a spiral manner.

When the wire rod is wound around the core rod, the core rod is drawn out from the distal end of the core rod nozzle in a state in which the constant tension is applied to the core rod. The outer diameter of the core rod during the winding of the wire rod is smaller than the outer diameter in the natural state, and so, the outer diameter of the core rod becomes relatively uniform. Thus, the wire rod is wound around the core rod having the smaller outer diameter and with little variation in the outer diameter in the lengthwise direction.

After the winding, when the tension applied to the core rod is released, the stretched core rod returns to the natural state to which the tension is not applied, and then, the outer diameter of the core rod is increased. Therefore, the wire rod, which is wound around the outer circumference of the core rod in a spiral manner in a state in which the outer diameter is small, comes into suitably close contact with the outer circumferential surface of the core rod the outer diameter has been increased, and a state in which the wire rod is wound around the core rod in a spiral manner with the constant inner diameter is achieved.

Although the embodiments of the present invention have been described in the above, the above-mentioned embodiments merely illustrate a part of application examples of the present invention, and the technical scope of the present invention is not intended to be limited to the specific configurations of the above-described embodiments.

This application claims priority based on Japanese Patent Application No. 2019-49389 filed with the Japan Patent Office on Mar. 18, 2019, the entire contents of which are incorporated into this specification by reference.

The invention claimed is:

1. A coil winding apparatus, comprising:
- a core rod feeding unit configured to feed a string-shaped core rod from a core rod nozzle at a constant tension;
- a core rod drawing unit configured to draw out the core rod from the core rod nozzle against the tension by holding the core rod that has been fed from the core rod nozzle;
- a wire rod feeding unit configured to feed a wire rod towards the core rod that has been drawn out from the core rod nozzle, the wire rod being fed in a direction intersecting with a drawing direction of the core rod;
- a rotator into which the core rod nozzle is inserted, the rotator being capable of rotating about the core rod nozzle;
- a guide member provided on an end portion of the rotator at a position away from a position of an axis of rotation of the rotator, the guide member being configured to clamp, with the core rod, the wire rod that has been fed from the wire rod feeding unit; and
- a rotating unit configured to rotate the rotator together with the guide member so as to revolve the wire rod around the core rod in a vicinity of the core rod nozzle, wherein:
- the wire rod feeding unit includes:
  - a wire rod nozzle configured to feed the wire rod to pass therethrough;
  - a wire rod clamping tool configured to releasably clamp the wire rod passing through the wire rod nozzle; and
  - a fluid pressure cylinder including a main body portion and a retracting rod, the retracting rod projecting from the main body portion and having the wire rod nozzle mounted thereto, the retracting rod moving in a moving direction with respect to the main body portion, the fluid pressure cylinder being configured to increase and reduce a distance between the wire rod nozzle and the wire rod clamping tool by moving the retracting rod in the moving direction.

2. The coil winding apparatus according to claim 1, wherein
- the wire rod feeding unit further includes a wire-rod-nozzle moving unit configured to move at least the wire rod nozzle.

3. The coil winding apparatus according to claim 1, wherein
- the guide member is a pulley that is pivotably supported on an end portion of the rotator, such that the wire rod is guided around the core rod.

4. The coil winding apparatus according to claim 1, wherein the wire rod feeding unit further includes
- a support plate that supports the wire rod clamping tool; and
- a wire-rod-nozzle moving unit that moves the support plate in the moving direction, wherein
- the main body portion of the fluid pressure cylinder is mounted on the support plate.

5. A coil winding method for winding a wire rod around a string-shaped core rod in a spiral manner, the coil winding method comprising:
- inserting the core rod through a core rod nozzle while applying a predetermined tension to the core rod;
- inserting the wire rod into a wire rod nozzle and clamping the wire rod toward the wire rod nozzle with a wire rod clamping tool;
- moving a retracting rod of a fluid pressure cylinder in a moving direction with respect to a main body portion of the fluid pressure cylinder to move the wire rod nozzle closer to the wire rod clamping tool;
- moving the wire rod clamping tool and the wire rod nozzle closer to the core rod, together with the wire rod; and
- revolving the wire rod around the core rod in a vicinity of the core rod nozzle while drawing out the core rod from the core rod nozzle against the tension.

6. The coil winding method according to claim 5 comprising:
- feeding the wire rod from a direction orthogonal to a drawing direction of the core rod;
- clamping the wire rod by a guide member with the core rod in the vicinity of the core rod nozzle; and
- rotating the guide member about the core rod, thereby continuously winding a distal-end side of the wire rod around the core rod, the distal-end side of the wire rod being one side of the wire rod where the guide member clamps the wire rod.

7. The coil winding method according to claim 6, wherein
- the core rod nozzle is rotatably inserted into a rotator, and the guide member is provided on the end portion at a core-rod-drawing-side of the rotator at a position away from a position of an axis of rotation of the rotator, the coil winding method further comprising:
- rotating the guide member about the core rod by rotating the rotator on which the guide member is provided.

8. The coil winding method according to claim 6, further comprising:
- moving a proximal-end side of the wire rod in a drawing direction of the core rod at a same speed as a drawing speed of the core rod while drawing out the core rod from the core rod nozzle, the proximal-end side of the wire rod being an other side of the wire rod before the wire rod is wound around the wire core.

9. The coil winding method according to claim 5, wherein the wire rod clamping tool and the retracting rod of the fluid pressure cylinder are mounted on a support plate, the moving the wire rod clamping tool and the wire rod nozzle includes moving the support plate by a wire-rod-nozzle moving unit in the moving direction closer to the core rod.

* * * * *